(12) United States Patent
Isogawa et al.

(10) Patent No.: US 7,141,628 B2
(45) Date of Patent: Nov. 28, 2006

(54) GOLF BALL AND GOLF BALL PAINT

(75) Inventors: Kazuhiko Isogawa, Kobe (JP); Koichi Fujisawa, Kobe (JP)

(73) Assignee: SRI Sports Limited, Kobe (JP)

( * ) Notice: Subject to any disclaimer, the term of this patent is extended or adjusted under 35 U.S.C. 154(b) by 21 days.

(21) Appl. No.: 10/730,116

(22) Filed: Dec. 9, 2003

(65) Prior Publication Data

US 2004/0116623 A1 Jun. 17, 2004

(30) Foreign Application Priority Data

Dec. 10, 2002 (JP) .............................. 2002-357672

(51) Int. Cl.
*A63B 37/14* (2006.01)
*A63B 37/00* (2006.01)
*C09D 175/06* (2006.01)

(52) U.S. Cl. ...................... 525/440; 525/123; 524/376; 524/591; 528/80; 528/81; 528/83; 473/371; 473/378

(58) Field of Classification Search ................ 524/376, 524/591; 525/123, 440; 528/80, 81, 83; 473/371, 378
See application file for complete search history.

(56) References Cited

U.S. PATENT DOCUMENTS 4,172,822 A * 10/1979 Patzschke ................... 524/539
6,096,851 A * 8/2000 Maruoka et al. .............. 582/85
6,454,667 B1 * 9/2002 Iwami ........................ 473/378
6,509,410 B1   1/2003 Ohira et al.

OTHER PUBLICATIONS

Chemical Abstract registry No. 111-76-2.*

* cited by examiner

*Primary Examiner*—David J. Buttner
(74) *Attorney, Agent, or Firm*—Birch, Stewart, Kolasch & Birch, LLP

(57) ABSTRACT

The object of the present invention is to provide a golf ball having an improved impact resistance without lowering the productivity, and a golf ball paint which is used therefor.

The present invention is characterized in the use of two component curing type urethane paint comprising an aqueous polyol having hydroxyl value of from 50 mgKOH/g below 100 mgKOH/g and a weight average molecular weight of 4,000 to 20,000, and a polyisocyanate.

12 Claims, No Drawings

GOLF BALL AND GOLF BALL PAINT

This nonprovisional application claims priority under 35 U.S.C. § 119(a) on Patent Application No. 2002-357672 tiled in JAPAN on Dec. 10, 2002, the entire contents of which are hereby incorporated by reference.

BACKGROUND OF THE INVENTION

1. Field of the Invention

The present invention relates to a golf ball having a paint film on the surface of the golf ball body, and a golf ball paint therefor, more particularly to a golf ball paint which has the reduced amount of volatile organic solvent in view of the environmental problem and the golf ball using the golf ball paint.

2. Description of the Related Art

A golf ball generally has a paint film on the surface thereof to impart a gloss and protect the mark printed thereon. It is required for the paint film to have durability against the impact of the shot and exhibit the weather-resistance which prevents the change of the color and the deterioration, due to the sunlight and the rain. Conventionally, the solvent borne paint such as a urethane paint and an epoxy paint has been used. In recent years, however, the approach to reduce the amount of the volatile organic solvent in the process of producing the golf ball has been studied in view of the environmental problems. For example, Japanese unexamined patent publication No.2001-271027 discloses a golf ball paint which comprises a water-soluble urethane polyol having hydroxyl value of 100 to 300 and a polyisocyanate having a hydrophilic group.

SUMMARY OF THE INVENTION

In an aqueous paint disclosed in Japanese unexamined patent publication No.2001-271027, since the water-soluble urethane polyol has hydroxyl value as high as from 100 to 300, the curing reaction becomes longer, resulting in the lower productivity. Further, the paint film formed from the above aqueous paint does not provide the sufficient impact resistance, which is required for the golf ball.

The present invention has been achieved in view of the above circumstances. The object of the present invention is to provide a golf ball having a paint film which has an improved impact resistance without lowering the productivity, and a golf ball paint which is used therefor.

The present invention provides a golf ball having a paint film on the surface of the golf ball body, wherein the paint film has a thickness of 6 μm to 13 μm;

the paint film contains a base resin made by curing an aqueous polyol and a polyisocyanate; and the aqueous polyol has hydroxyl value of from 50 mgKOH/g to 100 mgKOH/g (exclusive) and a weight average molecular weight of 4,000 to 20,000.

The present invention also provides a golf ball paint comprising a two-component curing type urethane paint which comprises an aqueous polyol having hydroxyl value of from 50 mgKOH/g to 100 mgKOH/g (exclusive) and a weight average molecular weight of 4,000 to 20,000, and a polyisocyanate.

DESCRIPTION OF THE PREFERRED EMBODIMENT

First of all, the golf ball of the present invention will be described below. The present invention provides a golf ball having a paint film on the surface of the golf ball body, wherein the paint film has a thickness of 6 μm to 13 μm;

the paint film contains a base resin made by curing an aqueous polyol and a polyisocyanate; and the aqueous polyol has hydroxyl value of from 50 mgKOH/g to 100 mgKOH/g (exclusive) and a weight average molecular weight of 4,000 to 20,000.

Herein, "aqueous polyol" of the present invention includes "water-soluble polyol" which is soluble in water as well as " water dispersible polyol" which can be dispersed into water. In both cases, it is possible to reduce the amount of the volatile organic solvent.

The aqueous polyol has hydroxyl value of not less than 50 mgKOH/g, more preferably not less than 55 mgKOH/g, and has hydroxyl value of less than 100 mgKOH/g, more preferably not more than 95 mgKOH/g. If the aqueous polyol has hydroxyl value of less than 50 mgKOH/g, the adhesion between the paint film and the golf ball body will be lowered. While if the aqueous polyol has hydroxyl value of 100 or more mgKOH/g, the curing reaction with the polyisocyanate takes longer time, resulting in the lower productivity. The hydroxyl value is determined, for example, by the potentiometric titration, according to JIS-K1557.

The aqueous polyol has a weight average molecular weight of 4,000 or more, preferably 5,000 or more, more preferably 6,000 or more, and has a weight average molecular weight of 20,000 or less, preferably 17,000 or less, more preferably 15,000 or less. If the weight average molecular weight is less than 4,000, it takes longer time to dry the paint, resulting in the lower productivity, while if the weight average molecular weight is more than 20,000, the hydroxyl value becomes relatively low, thus the adhesion between the paint film and the golf ball body will be lowered. The molecular weight of the aqueous polyol is determined by Gel permeation chromatography using polystyrene as a standard material.

The aqueous polyol is not limited, as long as the hydroxyl value and the weight average molecular weight thereof fall within the above range and it has at least two hydroxyl groups. Examples of the aqueous polyol are an aqueous polyester polyol, an aqueous polyether polyol, an aqueous urethane polyol, an aqueous acrylic polyol, an aqueous alkyd resin, a polyvinyl alcohol, and a cellulose derivative such as hydroxyl ethylcellulose and carboxyl methylcellulose. Among them, it is preferable to use the aqueous polyester polyol, because the aqueous polyester polyol improves the impact resistance of the resulting urethane paint film.

As described above, the aqueous polyester polyol includes a water-soluble polyester polyol and a water dispersible polyester polyol. Examples of the aqueous polyester polyol are a polyester polyol having a carboxyl group and a polyester polyol having a sulfonic acid group. Typically preferred as the aqueous polyester polyol is the aqueous polyester polyol having the carboxyl group, which will be soluble or dispersible into water by neutralizing the carboxyl group with a base.

The aqueous polyester polyol can be produced, according to the method which is well-known for producing the conventional polyester polyol. For example, the aqueous polyester polyol can be obtained by the polycondensation between a (low molecular weight) polyol and a polybasic acid.

The carboxyl group for making the polyester polyol aqueous can be introduced from either the polyol component or the polybasic acid component. A polyol component for introducing the carboxyl group into the polyester polyol includes dimethylol propionic acid, dimethylol butanoic acid, dihydroxyl propionic acid, dihydroxyl succinic acid. The polyol component, other than the polyol component for introducing the carboxyl group, includes a well known polyol for preparing the polyester polyol. Examples of the well known polyol are a diol such as ethylene glycol, propylene glycol, 1,3-propanediol, 1,4-butanediol, 1,5-pentanediol, 3-methyl-1,5-pentanediol, 1,6-hexanediol, neopentyl glycol, diethylene glycol, triethylene glycol, tetraethylene glycol, dipropylene glycol, tripropylene glycol, 1,4-cyclohexanediol, bisphenol A; or a triol such as glycerin, and trimethylol propane. The above polyol can be used individually or in combination of at least two of them.

The polybasic acid component for introducing the carboxyl group into the polyester polyol includes, for example, trimellitic anhydride and pyromellitic anhydride. The polybasic acid, other than the polybasic acid for introducing the carboxyl group, includes a dibasic acid such as succinic acid, adipic acid, azelaic acid, sebacic acid, dodecanedicarboxylic acid, maleic anhydride, fumaric acid, 1,3-cyclopentanedicarboxylic acid, 1,4-cyclohexanedicarboxylic acid, terephtalic acid, isophtalic acid, 1,4-naphtalenedicarboxylic acid, 2,5-naphtalenedicarboxylic acid, 2,6-naphtalenedicarboxylic acid, naphtalic acid (1,8-naphtalenedicarboxylic acid), biphenyldicarboxylic acid. The above polybasic acid can be used individually or in combination of at least two of them.

The aqueous polyether polyol includes, for example, a polyethylene glycol.

The aqueous urethane polyol is not limited, as long as it has a urethane bond in the molecular chain thereof and a plurality of hydroxyl groups. The aqueous urethane polyol can be obtained by reacting the above aqueous polyester polyol and/or the aqueous polyether polyol with the polyisocyanate in such a molar ratio that the hydroxyl group of the polyol component is excess to the isocyanate group of the polyisocyanate.

The polyisocyanate used as a curing agent in the present invention is not limited, as long as it has at least two isocyanate groups. The polyisocyanate includes, for example, an aromatic polyisocyanate such as 2,4-tolylene diisocyanate, 2,6-tolylene diisocyanate, a mixture (TDI) of 2,4-tolylene diisocyanate and 2,6-tolylene diisocyanate, 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylenediisocyanate(TMXDI) and para-phenylene diisocyanate (PPDI); and an alicyclic or aliphatic polyisocyanate such as 4,4'-dicyclohexylmethane diisocyanate (hydrogenated MDI), hydrogenated xylylenediisocyanate($H_6$XDI) hexamethylene diisocyanate (HDI), and isophorone diisocyanate (IPDI). The polyisocyanate can be used either alone or in combination of two or more. Among them, non-yellowing type polyisocyanate (TMXDI, XDI, $H_6$XDI, IPDI,$H_{12}$MDI) are preferable in view of weather resistance.

As the polyisocyanate, the water dispersible polyisocyanate having the introduced hydrophilic group can be also used. The use of the water dispersible polyisocyanate allows a homogenous curing reaction between the aqueous polyol and the polyisocyanate.

The mixing ratio (NCO/OH) of the polyisocyanate to the aqueous polyol is not limited. NCO/OH (molar ratio) is preferably not less than 0.8, more preferably not less than 0.9, even more preferably not less than 1, while the NCO/OH (molar ratio) is preferably not more than 1.6, more preferably not more than 1.5. If NCO/OH (molar ratio) is less than 0.8, the curing reaction tends to be insufficient. The insufficient curing reaction causes the tackiness of the resulting paint film, thus the dust and the dirt tend to adhere to the resultant paint film. While if the molar ratio of NCO/OH is greater than 1.6, the residual isocyanate group tends to react with moisture, thereby generating $CO_2$. As a result, the air bubble tends to be contained in the paint film.

The paint film of the inventive golf ball, may further include a conventional additive such as a pigment, an ultraviolet (UV) absorber, an antioxidant, a light-stabilizer, a fluorescent brightener, and an anti-blocking agent and the like, which can be generally used for the golf ball.

The paint film has a thickness of 6 μm to 13 μl m. If the thickness is less than 6 μm, the paint film will be worn out due to the continuous use. While if the thickness is more than 13 μm, the dimple will not work efficiently, thus the flying performance of the resultant golf ball tends to be low. In addition, the paint film may have the single layer structure or the multi layer structure having at least two layers, as long as the thickness of the paint film falls within the above range. The paint film preferably has the single layer structure, because of simplifying the painting process. The paint film can be made the outer most clear paint layer, or can be made the enamel paint layer containing the pigment. In the case that the paint film is made the enamel paint layer, the clear paint layer can be further formed thereon.

Next, the two-component curing type urethane paint of the present invention will be described. The two-component curing type urethane paint, without limitation, includes the above aqueous polyol and the polyisocyanate, and may further include an organic solvent. The organic solvent is used for, for example, facilitating the preparation of the aqueous liquid of the aqueous polyol. The organic solvent includes an organic solvent such as acetone, methyl ethyl ketone, ethyl acetate, N,N-dimethylformamide, N-metylpyrolidone. As the above organic solvent, it is preferable to use so called "film forming additive". The film forming additive can enhance the film forming ability of the paint film, thereby improving the property of the resultant paint film as well as facilitating the preparation of the aqueous liquid of the aqueous polyol. Further, since the film forming additive is less volatile, it is possible to reduce the amount of the volatile organic solvent.

Examples of the film forming additive are a glycolic ether type solvent such as ethyleneglycol monomethylether, ethyleneglycol monoethylether, ethyleneglycol monobutylether, ethyleneglycol monohexylether, ethyleneglycol 2-ethylhexylether, propyleneglycol butylether, dipropyleneglycol butylether, diethyleneglycol monoethylether, diethyleneglycol monobutylether; a glycolic ester type solvent such as ethyleneglycol monomethylether acetate, ethyleneglycol monoethylether acetate, propyleneglycol monomethylether acetate, diethyleneglycol monoethylether acetate, diethyleneglycol monobutylether acetate. Among them, ethyleneglycol monomethylether is preferable. The ethyleneglycol monomethylether is water-soluble enough to facilitate the preparation of the aqueous liquid of the aqueous polyol. The above organic solvent and film forming additive can be used either alone or in combination of at least two of them.

The organic solvent or the film forming additive is preferably used in an amount of 1 part or more, more preferably 3 parts or more, while used in an amount of 20 parts or less, more preferably 13 parts or less, based on 100 parts of the aqueous polyol by mass(weight). Because the use in an amount of more than 20 parts does not meet with the object to reduce the volatile component as well as raise the raw material cost of the paint. While if the amount is less than 1 part by mass, the film forming ability tends to be lowered and the preparation of the aqueous polyol liquid tends to be more difficult.

The preparation of the aqueous polyol liquid is not limited, and is conducted by, for example, neutralizing the carboxyl group with the base in the case of the polyol having a carboxyl group. The base for neutralizing the carboxyl group includes a primary amine such as ammonia, methylamine, and ethylamine; a secondary amine such as diethanol amine, dimethyl amine, and diethyl amine; a tertiary amine such as triethyl amine and triethanol amine; a hydroxide of alkali metal such as sodium hydroxide and potassium hydroxide. Further, in the cases of the aqueous polyether polyol having polyethylene oxide chain, the polyvinyl alcohol, and the cellulose derivative, the aqueous liquid thereof is prepared by mixing and agitating them with water. If necessary, the solubilization may be conducted at the elevated temperature.

The aqueous polyol liquid preferably has the concentration of 20 mass % or more, more preferably 25 mass % or more, while preferably has the concentration of 65 mass % or less, more preferably 60 mass % or less. If the concentration is less than 20 mass %, the curing reaction between the aqueous polyol and the polyisocyanate of the curing agent tends to be slow. If the concentration is more than 65 mass %, the viscosity will be higher, resulting in the lower painting-workability.

The two-component curing type urethane paint of the present invention includes an additive such as a pigment, an UV absorber, an antioxidant, a light-stabilizer, a fluorescent brightener, an anti-blocking agent, a leveling agent, a slipping agent, and a viscosity modifier, which are conventionally used for the golf ball paint.

According to the present invention, the paint film is formed by applying and drying the above two-component curing type urethane paint on the surface of the golf ball body. The method of applying the above paint is not limited, and includes the conventional method for the two-component curing type paint. For example, the electrostatic coating method, or spray method using a spray gun can be employed after mixing the aqueous polyol liquid with the polyisocyanate for the application of the paint to the golf ball. Further, the surface of the golf ball may be subjected to the surface treatment such as cleaning or sandblast. In the case of applying the paint with the spray gun, the aqueous polyol liquid and the polyisocyanate may be mixed bit by bit, or the aqueous polyol liquid and the polyisocyanate are fed with the respective pumps and continuously mixed in a constant ratio through the static mixer located in the stream line just before the spray gun. Alternatively, the aqueous polyol liquid and the polyisocyanate can be air-sprayed respectively with the spray gun having the device for controlling the mixing ratio thereof. Subsequently, the two-component curing type urethane paint coated on the surface of the golf ball body is dried, for example, at the temperature of less than 50° C. for 0.5 to 2 hours to obtain the paint film.

The golf ball of the present invention has no limitation on its structure and includes a one-piece golf ball, a two-piece golf ball, a multi-piece golf ball comprising at least three layers, and a wound-core golf ball. The present invention can be applied for all types of the golf ball. In the following, the method for preparing the golf ball of the present invention will be explained based on the embodiment of the two-piece golf ball, but the present invention is not limited to the two-piece golf ball and the process explained below.

The present invention can employ any core which is well-known as the core for the two-piece golf ball. The core of the two-piece golf ball, for example, without limitation, is preferably a molded body which is formed by vulcanizing a rubber composition. The rubber composition preferably comprises a base rubber, a co-crosslinking agent, and a crosslinking initiator.

Examples of the base rubber are butadiene rubber (BR), ethylene-propylene-diene terpolymer (EPDM), isoprene rubber (IR), styrene-butadiene rubber (SBR), and acrylonitrile-butadiene rubber (NBR). Among them, butadiene rubber, particularly cis-1,4-polybutadiene, is preferable in view of its superior repulsion property. Typically preferred is the high cis-polybutadiene rubber having cis-1,4 bond in a proportion of not less than 40%, more preferably not less than 70%, even more preferably not less than 90%.

The co-crosslinking agent used in the present invention includes, for example, an α,β-unsaturated carboxylic acid or a metal salt thereof. Typically preferred is the α,β-unsaturated carboxylic acid having 3 to 8 carbon atoms such as acrylic acid and methacrylic acid or the metal salt thereof. As the metal forming the metal salt of the α,β-unsaturated carboxylic acid, a monovalent or divalent metal such as zinc, magnesium, calcium, aluminum and sodium is preferably used. Among them, zinc is preferable, because it can impart the higher repulsion property to the golf ball. The amount of the co-crosslinking agent to be blended in the rubber composition is preferably not less than 20 parts by mass, more preferably not less than 25 parts by mass, and preferably not more than 50 parts by mass, more preferably not more than 40 parts by mass based on 100 parts by mass of the base rubber.

As the crosslinking initiator, an organic peroxide is preferably used. Examples of the organic peroxide for use in the present invention are dicumyl peroxide, 1,1-bis(t-butylperoxy)-3,5-trimethylcyclohexane, 2,5-dimethyl-2,5-di(t-butylperoxy)hexane, and di-t-butyl peroxide. Among them, dicumyl peroxide is preferable. The amount of the organic peroxide to be blended in the rubber composition is preferably not less than 0.2 part by mass, more preferably not less than 0.3 part by mass, and preferably not more than 1.5 parts by mass, more preferably not more than 1.0 part by mass based on 100 parts by mass of the base rubber.

The rubber composition for the core may further contain a specific gravity adjusting agent such as zinc oxide and barium sulfate, an antioxidant, a color powder, and the like, as required.

The core is formed by press-molding the above rubber composition into the spherical body at the heating conditions. The conditions for the press-molding should be determined depending on the rubber composition. The press-molding is preferably carried out for 10 to 60 minutes at the temperature of 130 to 200° C. Alternatively, the press-molding is preferably carried out in a two-step heating, for example, for 20 to 40 minutes at the temperature of 130 to 150° C., and continuously for 5 to 15 minutes at the temperature of 160 to 180° C.

The core thus obtained is covered with the cover composition to form a golf ball body. The cover composition, for example, includes a thermoplastic resin such as an ionomer resin, a urethane resin; a two-component curing type urethane resin; a balata and a hard rubber. Further, when forming the cover, the cover can be formed with a multiplicity of concavities, which is so called "dimple", at the surface thereof. As required, the surface of the golf ball can be subjected to grinding treatment such as sandblast in order to improve the adhesion of the mark and the paint film.

Although the method for preparing the golf ball is explained based on the embodiment of the two-piece golf ball, the wound core can be used for preparing a wound golf ball, and at least one intermediate layer can be formed between the core and the cover for preparing the multi-piece golf ball including at least three layers.

For preparing a wound core golf ball, a conventional wound core can be used in the present invention. The wound core comprises a center and a rubber thread layer which is formed by winding a rubber thread around the center in an elongated state. Examples of the center are a liquid center and a solid center formed of rubber. In the present invention, the rubber thread, which is conventionally used for winding around the center, can be adopted for winding around the center. The rubber thread, for example, is obtained by vulcanizing a rubber composition including a natural rubber, or a mixture of natural rubber and a synthetic polyisoprene, a sulfur, a vulcanization auxiliary agent, a vulcanization accelerator, and an antioxidant. The rubber thread is wound around the center in elongation of about 10 times length to form the wound core.

When preparing a multi-piece golf ball comprising at least three layers, the intermediate layer includes, for example, a thermoplastic resin such as a polyurethane resin, an ionomer resin, Nylon, and a polyethylene; a thermoplastic elastomer such as a polystyrene elastomer, a polyolefin elastomer, a polyurethane elastomer, a polyester elastomer, a polyamide elastomer.

Examples of the ionomer resin are one prepared by neutralizing at least a part of carboxyl groups in a copolymer composed of ethylene and $\alpha,\beta$-unsaturated carboxylic acid with a metal ion, and one prepared by neutralizing at least a part of carboxyl groups in a terpolymer composed of ethylene, $\alpha,\beta$-unsaturated carboxylic acid and $\alpha,\beta$-unsaturated carboxylic acid ester with a metal ion.

Examples of the $\alpha,\beta$-unsaturated carboxylic acid are acrylic acid, and methacrylic acid. Examples of the $\alpha,\beta$-unsaturated carboxylic acid ester are methyl ester, ethyl ester, propyl ester, n-butyl ester, isobutyl ester and the like of acrylic acid, methacrylic acid. The metal for neutralizing the carboxyl group includes alkali metal such as sodium, potassium, and lithium; or alkali earth metal such as magnesium, calcium; or divalent transition metal such as zinc, and copper. Further, the above ionomer resin can be used as the mixture thereof in order to obtain the desired resilience and hardness.

The intermediate layer may further include a gravity adjusting agent such as barium sulfate and tungsten, an antioxidant, a pigment and the like.

EXAMPLES

The following examples illustrate the present invention, however these examples are intended to illustrate the invention and are not to be construed to limit the scope of the present invention. Many variations and modifications of such examples will exist without departing from the scope of the inventions. Such variations and modifications are intended to be within the scope of the invention.

(1) Evaluation Method (1-1) Durability

Each golf ball was hit 150 times repeatedly with a five iron attached to a swing robot manufactured by TRUETEMPER CO, at the head speed of 34 m/sec. The durability was evaluated based on the following criteria.

Excellent: None of the paint film peeled off.

Good: The area where the paint film peeled off was not more than 5% with respect to the whole area of the paint film.

Fair: The area where the paint film peeled off was from 5% (exclusive) to 20% with respect to the whole area of the paint film.

Poor: The area where the paint film peeled off was more than 20% with respect to the whole area of the paint film.

(1-2) Drying Characteristic of the Paint Film

Two-component curing type urethane paint was coated on the golf ball body, and dried in the oven heated at the temperature of 40° C. The time until the paint film is free of the tackiness was measured.

(2) Preparation of Two-component Curing Urethane Paint (2-1) Aqueous Polyol No.1

45 parts of neopentyl glycol, 29.8 parts of isophtalic acid, 13 parts of adipic acid, and 7.8 parts of trimellitic anhydride were charged into the reactor and reacted at the temperature of 230° C. for 5 hours under nitrogen, and then 4.4 parts of trimellitic anhydride was added and reacted for 2 hours after lowering the temperature to 190° C. to obtain the aqueous polyester polyol. After the reaction, ethyleneglycol monoethylether was added to obtain the diluted liquid of the aqueous polyester polyol with the non-volatile component of 80 mass %. The diluted liquid was cooled to 50° C., and 8 parts of ion exchanged water was further added therein, and agitated for 30 minutes. Subsequently, 5.5 parts of dimethylethanol amine was added to neutralize the aqueous polyester polyol while agitating for 1 hour, and 70 parts of ion exchanged water was added while agitating for 1 hour to obtain the aqueous liquid of the aqueous polyester polyol. The hydroxyl value of the obtained aqueous polyester polyol was 53 mgKOH/g based on dry, and the weight average molecular weight was 15,500.

(2-2) Aqueous Polyol No.2

44 parts of neopentyl glycol, 30.2 parts of isophtalic acid, 12 parts of adipic acid, and 9.2 parts of trimellitic anhydride were charged into the reactor and reacted at the temperature of 230° C. for 4 hours under nitrogen, and then 4.6 parts of trimellitic anhydride was added and reacted for 2 hours after lowering the temperature to 190° C. to obtain the aqueous polyester polyol. After the reaction, ethyleneglycol monoethylether was added to obtain the diluted liquid of the aqueous polyester polyol with the non-volatile component of 80 mass %. The diluted liquid was cooled to 50° C., and 8 parts of ion exchanged water was further added therein, and agitated for 30 minutes. Subsequently, 5.5 parts of dimethylethanol amine was added to neutralize the aqueous polyester polyol while agitating for 1 hour, and 70 parts of ion exchanged water was added while agitating for 1 hour to obtain the aqueous liquid of the aqueous polyester polyol. The hydroxyl value of the obtained aqueous polyester polyol was 75 mgKOH/g based on dry, and the weight average molecular weight was 9,560.

(2-3) Aqueous Polyol No.3

43 parts of neopentyl glycol, 30.2 parts of isophtalic acid, 12.6 parts of adipic acid, and 9.2 parts of trimellitic anhydride were charged into the reactor and reacted at the temperature of 230° C. for 4 hours under nitrogen, and then 5 parts of trimellitic anhydride was added and reacted for. 2 hours after lowering the temperature to 190° C. to obtain the aqueous polyester polyol. After the reaction, ethyleneglycol monoethylether was added to obtain the diluted liquid of the aqueous polyester polyol with the non-volatile component of 80 mass %. The diluted liquid was cooled to 50° C., and 8 parts of ion exchanged water was further added therein, and agitated for 30 minutes. Subsequently, 5.5 parts of dimethylethanol amine was added to neutralize the aqueous polyester polyol while agitating for 1 hour, and 70 parts of ion exchanged water was added while agitating for 1 hour to obtain the aqueous liquid of the aqueous polyester polyol. The hydroxyl value of the obtained aqueous polyester polyol was 93 mgKOH/g based on dry, and the weight average molecular weight was 4,800.

(2-4) Aqueous Polyol No.4

42.2 parts of neopentyl glycol, 30.2 parts of isophtalic acid, 10 parts of adipic acid, and 12.6 parts of trimellitic anhydride were charged into the reactor and reacted at the temperature of 230° C. for 4 hours under nitrogen, and then 5 parts of trimellitic anhydride was added and reacted for 2 hours after lowering the temperature to 190° C. to obtain the aqueous polyester polyol. After the reaction, ethyleneglycol monoethylether was added to obtain the diluted liquid of the aqueous polyester polyol with the non-volatile component of 80 mass %. The diluted liquid was cooled to 50° C., and 8 parts of ion exchanged water was further added therein, and agitated for 30 minutes. Subsequently, 5.5 parts of dimethylethanol amine was added to neutralize the aqueous polyester polyol while agitating for 1 hour, and 70 parts of ion exchanged water was added while agitating for 1 hour to obtain the aqueous liquid of the aqueous polyester polyol. The hydroxyl value of the obtained aqueous polyester polyol was 105 mgKOH/g based on dry, and the weight average molecular weight 3,550.

(2-5) Aqueous Polyol No.5

45.5 parts of neopentyl glycol, 29.5 parts of isophtalic acid, 15.6 parts of adipic acid, and 5 parts of trimellitic anhydride were charged into the reactor and reacted at the temperature of 230° C. for 5 hours under nitrogen, and then 4.4 parts of trimellitic anhydride was added and reacted for 4 hours, after lowering the temperature to 190° C. to obtain the aqueous polyester polyol. After the reaction, ethyleneglycol monoethylether was added to obtain the diluted liquid of the aqueous polyester polyol with the non-volatile component of 80 mass %. The diluted liquid was cooled to 50° C., and 8 parts of ion exchanged water was further added therein, and agitated for 30 minutes. Subsequently, 5.5 parts of dimethylethanol amine was added to neutralize the aqueous polyester polyol while agitating for 1 hour, and 70 parts of ion exchanged water was added while agitating for 1 hour to obtain the aqueous liquid of the aqueous polyester polyol. The hydroxyl value of the obtained aqueous polyester polyol was 44 mgKOH/g based on dry, and the weight average molecular weight was 21,000.

(2-6) Two Component Curing Type Urethane Paint

Each of the aqueous polyols Nos.1 to 5 was mixed with the curing agent of hexamethylenediisocyanate in such a molar ratio of NCO/OH=1.2 to obtain the two-component curing type urethane paints Nos.1 to 5.

(3) Production of the Two-piece Golf Ball (3-1) Preparation of Solid Core.

The rubber composition shown in Table 1 was kneaded and pressed with upper and lower molds each having a spherical cavity at the heating condition of 160° C. for 13 minutes to obtain the solid core in a spherical shape having a diameter of 39.3 mm.

TABLE 1

| Core formulation | Amount (parts) |
|---|---|
| Polybutadiene rubber | 100 |
| Zinc oxide | 5.6 |
| Zinc acrylate | 22.0 |
| Calcium carbonate | 21.0 |
| Dicumyl peroxide | 1.85 |

Note on Table 1:
Polybutadiene rubber: BR-11 (cis content: 96%) available from JSR Co.
Zinc acrylate: "ZNDA-90S" produced by NIHON JYORYU KOGYO Co,. LTD.
Zinc oxide: "Ginrei R" produced by Toho-Zinc Co.
Dicumyl peroxide: "Percumyl D" produced by NOF corporation.

(3-2) Preparation of the Cover Material

The materials shown in Table 2 were mixed using a twin-screw kneading extruder to obtain the cover composition in the form of pellet. The extrusion was conducted in the following conditions:
screw diameter=45 mm,
screw revolutions=200 rpm,
screw L/D=35, and
the cover composition was heated to from 200° C. to 260° C. at the die position of the extruder.

TABLE 2

| Cover formulation | Amount (parts) |
|---|---|
| Himilan 1605 | 40 |
| Himilan 1706 | 30 |
| Himilan 1707 | 30 |
| Titanium oxide | 2 |

Notes on Table 2:
HIMILAN 1605: an ionomer resin of a sodium ion-neutralized ethylene-methacrylic acid copolymer, available from MITSUI-DUPONT POLYCHEMICAL CO., LTD.
HIMILAN 1706: an ionomer resin of a zinc ion-neutralized ethylene-methacrylic acid copolymer, available from MITSUI-DUPONT POLYCHEMICAL CO., LTD.
HIMILAN 1707: an ionomer resin of a sodium ion-neutralized ethylene-methacrylic acid copolymer, available from MITSUI-DUPONT POLYCHEMICAL CO., LTD.

(3-3) Preparation of the Golf Ball Body

The cover composition thus prepared was directly injection-molded onto the core to form the cover, thereby obtaining the two-piece golf ball having a diameter of 42.7 mm. The upper and lower molds for forming the cover have a spherical cavity with dimples. The part of the dimples can serve as a hold pin which is retractable.

When forming the golf ball body, the hold pins were protruded to hold the core, and the resin heated at 210° C. was charged into the mold held under the pressure of 80 tons for 0.3 seconds. After the cooling for 30 seconds, the molds were opened and then the golf ball body was discharged.

The surface of the obtained golf ball was subjected to the sandblast treatment, the mark was printed, and then the two component curing type urethane paints Nos.1 to 5 were respectively sprayed thereto with the air-gun. The paint was dried in the oven heated at 40° C. to form the paint film having the thickness of 10 μm. The drying characteristic of the paint and the durability of the obtained paint film were evaluated in terms of each golf ball. The results were shown in Table 3.

TABLE 3

| | Golf ball No. (Two component urethane paint) | | | | |
|---|---|---|---|---|---|
| | 1 | 2 | 3 | 4 | 5 |
| Aqueous polyol | 1 | 2 | 3 | 4 | 5 |
| Hydroxyl value (mg KOH/g) | 53 | 75 | 93 | 105 | 44 |
| molecular weight | 15500 | 9560 | 4800 | 3550 | 21000 |
| Drying time (h) of Paint film | 1 | 1.5 | 1.5 | 5 | 1 |
| Durability | Good | Excellent | Good | Fair | Poor |

In table 3, two-component curing type urethane paints No.1 to No.3 were the cases that the hydroxyl value of the aqueous polyol falls within the range from 50 mgKOH/g to 100 mgKOH/g (exclusive) and the weight average molecular weight falls within the range from 4,000 to 20,000. In all cases, the drying time until the paint film is free of tackiness was less than 1.5 hours, and the paint films were excellent in durability.

On the other hand, in the two-component curing type urethane paint No.4, since the hydroxyl value of the aqueous polyol was 105 mgKOH/g, the curing reaction required 5 hours. Further, the weight average molecular weight was as low as 3,500, the durability was lowered. In the two-component curing type urethane paint No.5, it is considered that the durability was lowered due to the use of the aqueous polyol having the weight average molecular weight of 21,000.

According to the present invention, the amount of the volatile organic solvent can be reduced, and the golf ball which has the paint film with the excellent durability can be obtained without lowering the productivity.

This application is based on Japanese Patent application No.2002-357672 filed on Dec. 10, 2002, the contents of which are hereby incorporated by reference.

What is claimed is:

1. A golf ball having a paint film formed of two-component curing type urethane paint, wherein the urethane paint includes an aqueous polyol being at least one selected from the group consisting of an aqueous acrylic polyol, an aqueous polyester polyol, and an aqueous alkyd resin, the aqueous polyol having an hydroxyl value of from 50 mgKOH/g to 100 mgKOH/g (exclusive) and a weight average molecular weight of 5,000 to 20,000, and a polyisocyanate; and a mixing ratio of the polyisocyanate to the aqueous polyol has a molar ratio (NCO/OH) of greater than 1.0 to 1.6.

2. The golf ball according to claim 1, wherein the aqueous polyol is the aqueous polyester polyol.

3. The golf ball according to claim 1, wherein the urethane paint further comprises a film forming additive.

4. The golf ball according to claim 3, wherein the film forming additive is ethyleneglycol monoalkylether.

5. The golf ball according to claim 2, wherein the aqueous polyester polyol has a carboxyl group.

6. The golf ball according to claim 5, wherein an aqueous liquid of the aqueous polyester polyol is prepared by neutralizing the carboxyl group with a base.

7. The golf ball according to claim 5, wherein the carboxyl group is introduced from a polybasic acid component.

8. The golf ball according to claim 7, wherein the polybasic acid component includes trimellitic acid and pyromellitic acid.

9. A golf ball having a paint film on the surface of the golf ball body,
wherein the paint film has a thickness of 6 μm to 13 μm;
the paint film contains a base resin made by curing an aqueous polyol and a polyisocyanate;
the aqueous polyol is at least one selected from the group consisting of an aqueous acrylic polyol, an aqueous polyester polyol, and an aqueous alkyd resin;
the aqueous polyol has hydroxyl value of from 50 mgKOH/g to 100 mgKOH/g (exclusive) and a weight average molecular weight of 5,000 to 20,000;
and a mixing ratio of the polyisocyanate to the aqueous polyol has a molar ratio (NCO/OH) of greater than 1.0 to 1.6.

10. The golf ball according to claim 9, wherein the aqueous polyol is the aqueous polyester polyol.

11. The golf ball according to claim 1, wherein the mixing ratio of the polyisocyanate to the aqueous polyol has a molar ratio (NCO/OH) of 1.2 to 1.6.

12. The golf ball according to claim 9, wherein the mixing ratio of the polyisocyanate to the aqueous polyol has a molar ratio (NCO/OH) of 1.2 to 1.6.

* * * * *